(12) United States Patent
Fletcher et al.

(10) Patent No.: US 6,269,401 B1
(45) Date of Patent: Jul. 31, 2001

(54) INTEGRATED COMPUTER SYSTEM AND NETWORK PERFORMANCE MONITORING

(75) Inventors: Richard A. Fletcher, San Jose; Prakash C. Banthia, Santa Clara; Amanda Svensson, San Jose, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/143,486

(22) Filed: Aug. 28, 1998

(51) Int. Cl.[7] ................................. G06F 13/00
(52) U.S. Cl. .................................. 709/224
(58) Field of Search .................... 709/201, 220, 709/221, 222, 223, 224

(56) References Cited

U.S. PATENT DOCUMENTS

| | | | |
|---|---|---|---|
| 5,375,070 | * 12/1994 | Hershey et al. | 709/224 |
| 5,758,071 | * 5/1998 | Burgess et al. | 709/220 |
| 5,796,633 | * 8/1998 | Burgess et al. | 702/187 |
| 5,963,943 | * 10/1999 | Cummins et al. | 707/10 |
| 5,974,457 | * 10/1999 | Waclawsky et al. | 709/224 |
| 6,058,102 | * 5/2000 | Drysdale et al. | 370/252 |
| 6,072,777 | * 6/2000 | Bencheck et al. | 370/244 |
| 6,088,622 | * 7/2000 | Dollin | 700/28 |
| 6,167,538 | * 12/2000 | Neufeld et al. | 714/47 |

* cited by examiner

Primary Examiner—Moustafa M. Meky
(74) Attorney, Agent, or Firm—Wagner, Murabito & Hao LLP

(57) ABSTRACT

A method for monitoring communication performance in a communication network comprising computer systems communicatively coupled to each other with communication equipment. In one embodiment, a computer system of a communication network measures and time-stamps network performance statistics and stores them in a memory unit within the computer system. The computer system also measures and time-stamps system performance statistics and system parameters and stores them in the memory unit within the computer system. The computer system reports the network performance statistics and the system information to a central computer system at specified time intervals. The central computer system correlates the network performance statistics and the system information for a specified time period based on the time-stamping and stores the network performance statistics and the system information in a memory unit within the computer system. The central computer system displays the correlated network performance statistics and system information to a user in response to the identification of a perturbation in the communication network, where the correlated network performance statistics and system information are displayed for a time interval contemporaneous with the perturbation, so that the user can integrally analyze the information.

25 Claims, 8 Drawing Sheets

INTEGRATED COMPUTER SYSTEM AND NETWORK PERFORMANCE MONITORING

TECHNICAL FIELD

The present invention relates to the field of computer system communication networks. In particular, the present invention pertains to computer system and network monitoring and management.

BACKGROUND ART

Computer systems linked to each other in a communication network are commonly used in businesses and like organizations. Computer system communication networks ("networks") are growing in size—as measured by the number of applications and the number of users they support—due to improvements in network reliability and the recognition of associated benefits such as increased productivity.

As the size of networks increases and as organizations become more reliant on such networks, the importance of effective network management tools also grows. In response to the need for standardization of such tools, primarily to control costs but also because components in a network are likely to originate from many different vendors, the Simple Network Management Protocol (SNMP) was developed and widely adopted. There have been a number of management information bases (MIBs) defined since adoption of SNMP, such as MIB-II, Remote Network Monitoring (RMON), and RMON2.

SNMP, RMON and RMON2 thus are network management software tools that provide a set of standards for network management and control, including a standard protocol, a specification for database structure, and a set of data objects. RMON and RMON2 are implemented in a network through MIBs which contain instructions specifying the data that are to be collected, how the data are to be identified, and other information pertinent to the purpose of network monitoring. In the prior art, the MIBs are implemented through RMON probes to monitor the local areas of the network. (An RMON probe typically is a computer system strategically located within the network so as to monitor a local area of the network.) The network monitoring information obtained by the RMON probes is communicated-to a central computer system that is accessible by the network manager.

Prior art network monitoring and management tools have trouble aiding the network manager in determining whether a problem within the network is associated with the network equipment itself or with the computer systems coupled to the network. If this information were known, it would allow the network manager to identify and implement the appropriate corrective action. For example, if a user places a request for a particular application from a client computer system to a server computer system and a response is delayed or is not received, the prior art network management tools do not give the network manager enough information to identify whether the problem is occurring because of a bottleneck in the network equipment or because the client or server computer system is not functioning properly.

Effective network monitoring and management tools are also needed in order for vendors of network management services to demonstrate compliance with the governing service level agreement (SLA). Many businesses contract with vendors for network management services. Such contracts are typically implemented with SLAs which specify metrics against which the provider of the network management services is measured. These metrics are used to quantify standards of performance that allow businesses to assess not only the performance of the network but also the performance of the network management services provider. Prior art network management tools generally do not provide effective means for monitoring the network and facilitating compliance with the requirements contained in the SLAs.

The prior art network monitoring and management tools are problematic because they do not provide the network manager with sufficient and readily accessible information enabling him/her to quickly pinpoint the source of a problem and solve it. In the prior art, the network manager must look at various sources of information, typically beginning with available network information from the RMON probes, to try to identify the cause of a problem. Once the network manager reviews the network information available, only then may he or she conclude that the problem is not with the network equipment but with a server or client computer system on the network. At this point, the network manager (or an equivalent system manager) begins a lengthy process of researching potential causes from the system perspective. While there may be some degree of manual coordination of the network and system efforts to identify the cause of a problem, the network tools in the prior art are not capable of automatically facilitating a coordinated effort to an extent that is optimum. Thus, in the prior art it is not possible to quickly and automatically pinpoint a problem as either a network problem or a system problem.

Timely correction of problems on a network is essential, because of the effect on user productivity and the desire for fast service that is prevalent among users. Service level agreements also place a premium on timely resolution of network problems. Thus, the prior art techniques for monitoring networks and identifying problems and their causes are not responsive to the requirements of the users and the business served by the network. The prior art techniques are also not responsive to the needs of the network and/or system managers who are charged with accomplishing timely identification and resolution of problems.

Another disadvantage to the prior art is that the RMON probes are capable only of monitoring network performance. The RMON probes cannot monitor the performance of client and server computer systems and communicate information about system performance to the central computer system used by the network manager. Therefore, in the prior art, the monitoring tools do not provide information about system performance.

In one prior art system, a server computer system and a client computer system send messages, commonly referred to as "heartbeats," to each other to affirm that a connection exists and that both computer systems are functioning. However, the heartbeats only communicate between the lower levels of software in the computer systems (e.g., between the protocol stacks), and so do not provide an indication of a possible problem at the higher levels of software, such as "memory thrashing" in the central processor unit of a computer system. Hence, a computer system may in fact be experiencing a problem that would not be detectable in the prior art, and the network/system manager may conclude based on the information available that the computer system is functioning satisfactorily.

Another drawback to the prior art is that the limited network and system information that is available to the network manager is not historical; that is, information regarding the recent performance of the network and system preceding the occurrence of a problem is not retrievable by the network manager. As such, the network manager can only view network or system performance after a user has identified a problem. Thus, in the prior art, valuable historical information that may aid the network manager in understanding the source of a problem is not available.

Thus, a need exists for a method to monitor a computer system communication network that readily detects a problem and permits the network manager to quickly identify the cause of the problem. A need further exists for a method that accomplishes the above and enables the network manager to demonstrate compliance with the provisions of the governing SLA. A need yet exists for a method that accomplishes the above and is compatible with the SNMP protocol that is currently employed. The present invention solves these needs. These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a method to monitor a computer system communication network that readily detects a problem and permits the network manager to quickly identify the cause of the problem. The present invention also provides a method that accomplishes the above and enables the network manager to demonstrate compliance with the provisions of the governing service level agreement (SLA). Finally, the present invention provides a method that accomplishes the above and is cost-effective and compatible with the Simple Network Management Protocol that is currently employed in many communication networks.

The present invention described herein provides a method for quantifying communication performance in a communication network having computer systems communicatively coupled to each other with communication equipment. In one embodiment, a computer system of a communication network measures and time-stamps network performance statistics and stores them in a memory unit within the computer system. The computer system also measures and time-stamps system performance statistics and system parameters and stores them in the memory unit within the computer system. The computer system reports the network performance statistics and the system information to a central computer system at specified time intervals. The central computer system correlates the network performance statistics and the system information for a specified time period based on the time-stamps. The central computer system displays the correlated network performance statistics and system information to a user in response to the identification of a perturbation in the communication network, where the correlated network performance statistics and system information are displayed for a time interval contemporaneous with the perturbation, so that the user can integrally analyze the information.

In one embodiment, the method provided by the present invention and described above is implemented using a management information base (MIB) extension to Remote Network Monitoring (RMON)-based software, where the RMON MIB specifies the system information to be measured and stored.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., processes of FIGS. 7 and 8), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
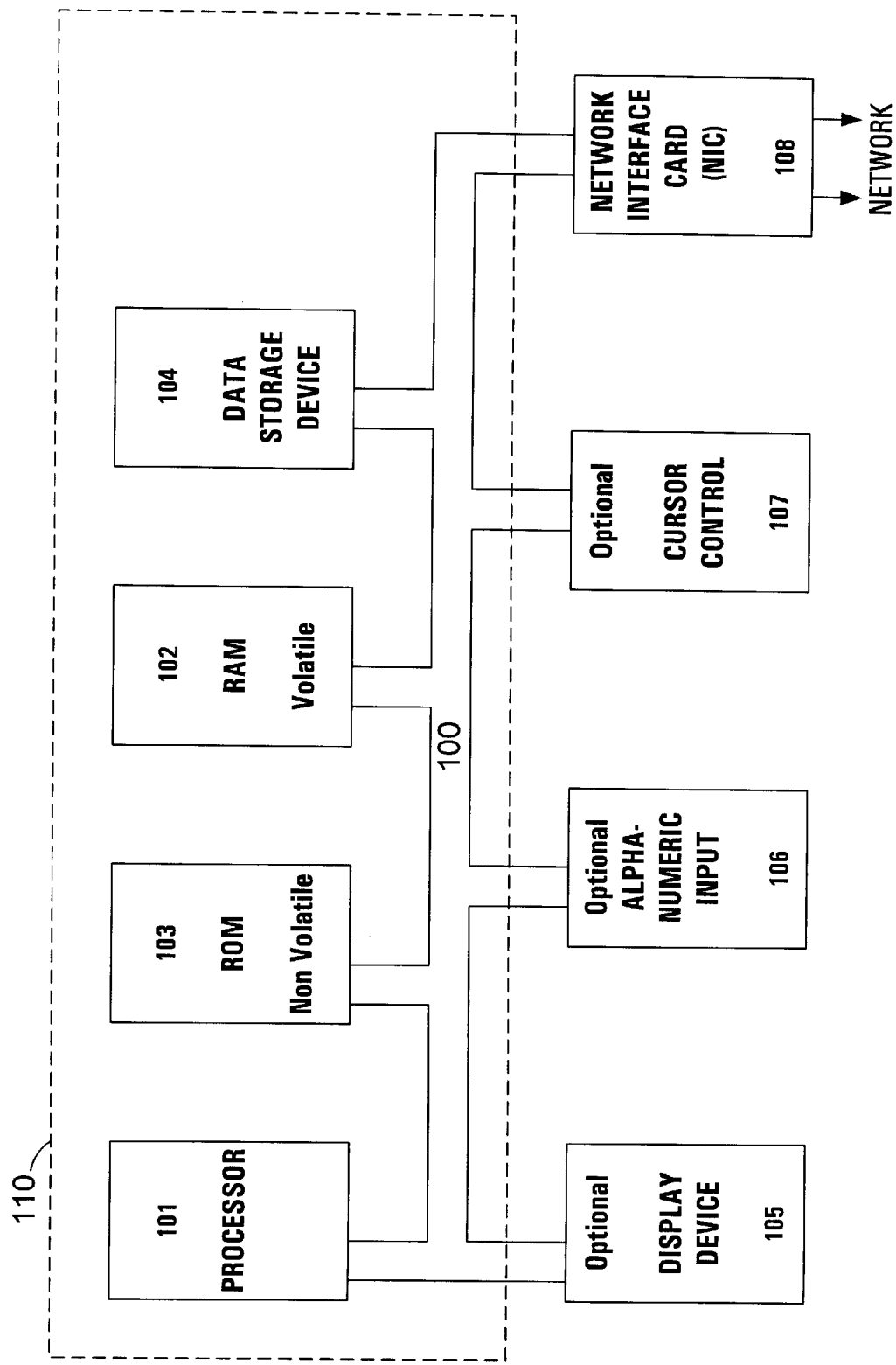
FIG. 1 shows a general purpose computer system upon which embodiments of the present invention may be practiced.

Refer to FIG. 1 which illustrates a host computer system, client computer system 110 (the following discussion is also pertinent to a server computer system and a central computer system). In general, client computer system 110 used by the embodiments of the present invention comprises a bus 100 for communicating information, a central processor 101 coupled with bus 100 for processing information and instructions, a random access memory 102 coupled with bus 100 for storing information and instructions for central processor 101, a read-only memory 103 coupled with bus 100 for storing static information and instructions for central processor 101, a data storage device 104 such as a magnetic or optical disk and disk drive coupled with bus 100 for storing information and instructions, a display device 105 coupled to bus 100 for displaying information to the computer user, an optional alphanumeric input device 106 including alphanumeric and function keys coupled to bus 100 for communicating information and command selections to central processor 101, an optional cursor control device 107 coupled to bus 100 for communicating user input information and command selections to central processor 101, and a network interface card (NIC) 108 coupled to bus 100 for communicating from a communication network to central processor 101.

Display device 105 of FIG. 1 utilized with client computer system 110 of the present invention may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices.

Figure 2:
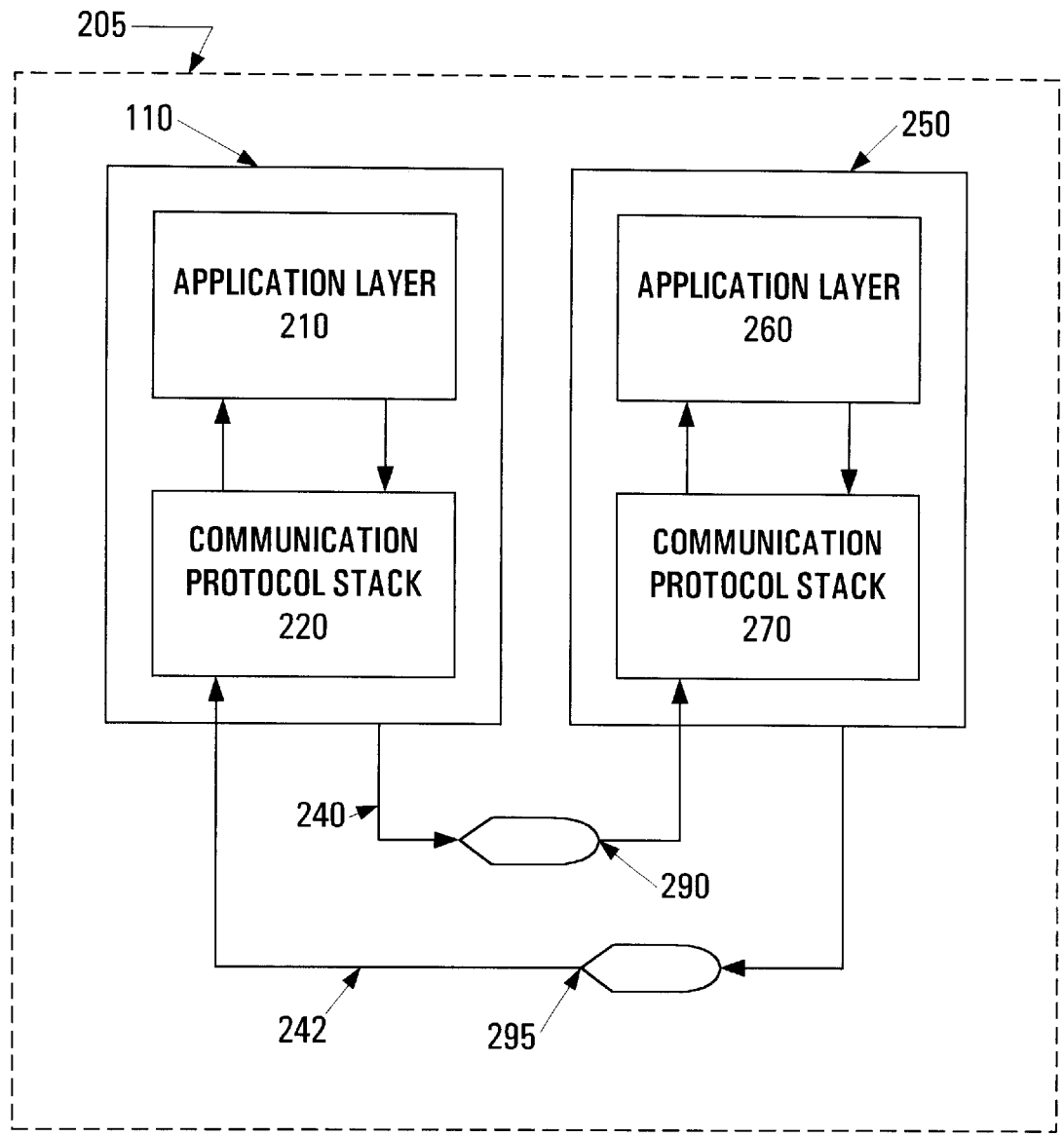
FIG. 2 is a diagram of an exemplary computer system communication network upon which the present invention may be practiced.

With reference now to FIG. 2, a diagram showing client computer system 110 coupled to server computer system 250 in communication network 205 is provided. In a typical communication network, there are a plurality of host computer systems, e.g., client computer systems and server computer systems, that are coupled to each other with communications equipment. For the discussion herein, a single client computer system 110 is shown coupled via communications lines 240 and 242 with a single server computer system 250, but more computer systems could be employed.

With reference still to FIG. 2, the software executed by central processor 101 (FIG. 1) of client computer system 110 is represented by application layer 210 which is separated from the remainder of protocol stack 220. Application layer 210 defines the manner in which network applications interact with the communication network, where network applications include computer software programs, word processors, database management systems, electronic mail, and the like. Protocol stack 220 contains the remaining layers of software that define the computer-to-computer or computer-to-network protocol, where protocol defines the procedures to be followed when data are transmitted and received. In a similar manner, server computer system 250 includes application layer 260 and protocol stack 270.

Continuing with reference to FIG. 2, one of the software layers (e.g., application layer 210) of client computer system 110 transmits a request to server computer system 250 in the form of request data packet 290, and server computer system 250 responds to the request in the form of response data packet 295. In this example, request data packet 290 and response data packet 295 are shown traveling by different communications lines (e.g., in a switched network environment), but it is appreciated that in the present invention the data packets alternatively can travel over the same communications line.

Figure 3:
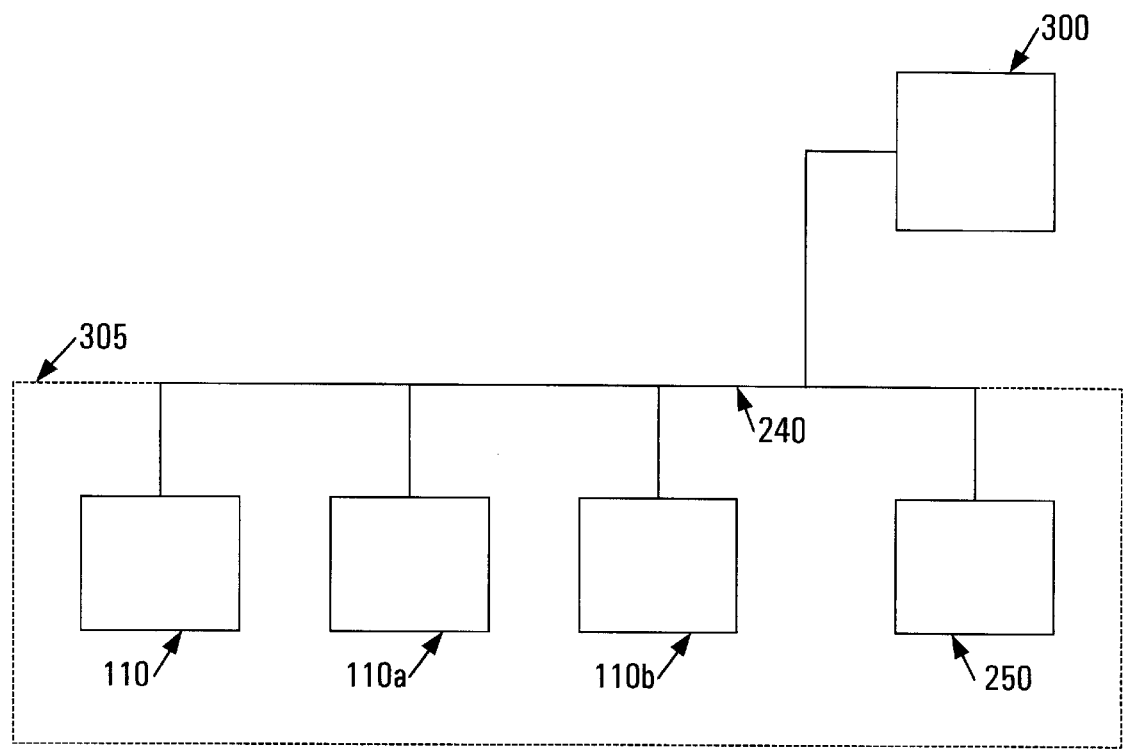
FIG. 3 is a diagram of a segment of an exemplary computer system communication network upon which the present invention may be practiced.

FIG. 3 shows segment 305 of a communication network including host computer systems exemplified by client computer systems 110, 110a, and 110b and server computer system 250, and central computer system 300 that is alternatively referred to as an "edge monitor." A communication network typically includes communicatively coupled switches, routers and additional segments (not shown). Edge monitor 300 receives information from multiple network segments.

The present invention includes a method for monitoring communication performance in a communication network such as that exemplified by FIG. 3. In accordance with the present invention, a host computer system (e.g., client computer system 110 or server computer system 250) measures and stores network performance statistics. The host computer system also measures and stores historical information including system information consisting of system performance statistics and system parameters. In the present invention, the network and system information are communicated to a central computer system (e.g., edge monitor 300), where the information is stored and catalogued in a manner that identifies the host computer system providing the information and the time period over which the information was measured by the host computer system. In accordance with the present invention, the network and system information is correlated so that it can be integrally analyzed. Based on the analysis, the present invention thus permits the network manager to make conclusions regarding the performance of the communication network and the cause of a network problem.

NETWORK PERFORMANCE STATISTICS—DEFINITION

Figure 4:
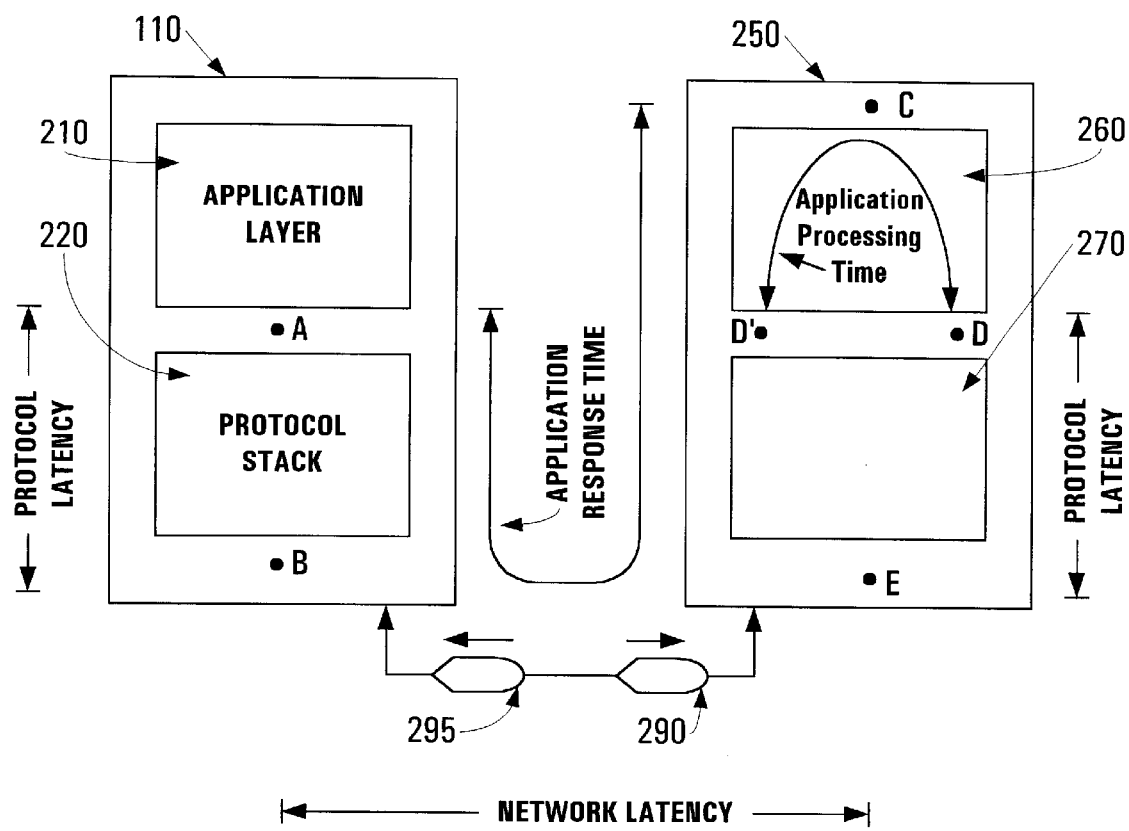
FIG. 4 is a diagram defining network performance statistics for an exemplary computer system communication network upon which the present invention may be practiced.

With reference now to FIG. 4, client computer system 110 is coupled to server computer system 250 in a communication network (e.g., communication network 205 of FIG. 2). A data packet takes a measurable amount of time to travel from client computer system 110 to server computer system 250, and vice versa. It also takes a measurable amount of time for a computer system to perform an application.

Continuing with reference to FIG. 4, "protocol latency" is the amount of time for a data packet to travel one-way through a protocol stack of a computer system. Hence, protocol latency is the amount of time for a data packet to travel from point A to point B or from point B to point A in protocol stack 220, or from point D to point E or point E to point D in protocol stack 270.

With reference to FIG. 4, "application processing time" is the time required for server computer system 250 to complete performing a network application in response to a request received from client computer system 110. In one embodiment of the present invention, application processing time is the elapsed time period between the time when request data packet 290 enters application layer 260 of server computer system 250 and the time when the corresponding response data packet 295 exits application layer 260 of server computer system 250 (one-way from point D to point D'). In another embodiment, application processing time is the period from the time when the application program interface of server computer system 250 issues a receive socket call corresponding to request data packet 290 to the time when the application program interface of server computer system 250 issues a send socket call corresponding to response data packet 295.

With reference still to FIG. 4, in one embodiment of the present invention, "application response time" is the elapsed time period between the time when request data packet 290 exits application layer 210 of client computer system 110 and the time when response data packet 295 enters application layer 210 of client computer system 110 (round trip from point A to point C), where response data packet 295 is sent in response to request data packet 290. In another embodiment, application response time is the time period between when the application program interface of client computer system 110 generates a send socket call corresponding to request data packet 290 and a receive socket call corresponding to receive socket call 295.

With reference to FIG. 4, "network latency" is the amount of time required for the data packet to travel from point B at which it exits one computer system to point E at which it enters another computer system, e.g., the time to travel one-way from network interface card 108 in client computer system 110 of FIG. 1, to the network interface card in server computer system 250, and vice versa.

The network performance statistics named above are determined as described in the copending patent application filed concurrently herewith and assigned to the assignee of the present invention, entitled "Application Response Time and Network Latency Monitoring Using End-Node Computer Systems," by Richard A. Fletcher and Prakash C. Banthia, with Ser. No. 09/141,968, and as described in the copending patent application filed concurrently herewith, assigned to the assignee of the present invention, entitled "Method for Analyzing Network Application Flows in an Encrypted Environment," by Richard A. Fletcher and Carl Lin, with Ser. No. 09/143,273, both of which are hereby incorporated by reference, and they still pending.

As described by the copending patent applications named above, in one embodiment the network performance statistics are determined using time-stamps that are applied by the client and server computer systems (e.g., client computer system 110 and server computer system 250 of FIG. 2) to the request and response data packets (e.g., request data packet 290 and response data packet 295 of FIG. 2). In another embodiment, the network performance statistics are determined using time-stamps that are applied by client computer system 110 and server computer system 250 to the socket calls that are issued by the application program interface corresponding to request data packet 290 and response data packet 295. As described in the copending patent applications referenced above, the difference between two time-stamps is used to measure the time for a data packet to travel from one of the points designated in FIG. 4 to another designated point.

NETWORK PERFORMANCE STATISTICS—OPERATION

Figure 5:
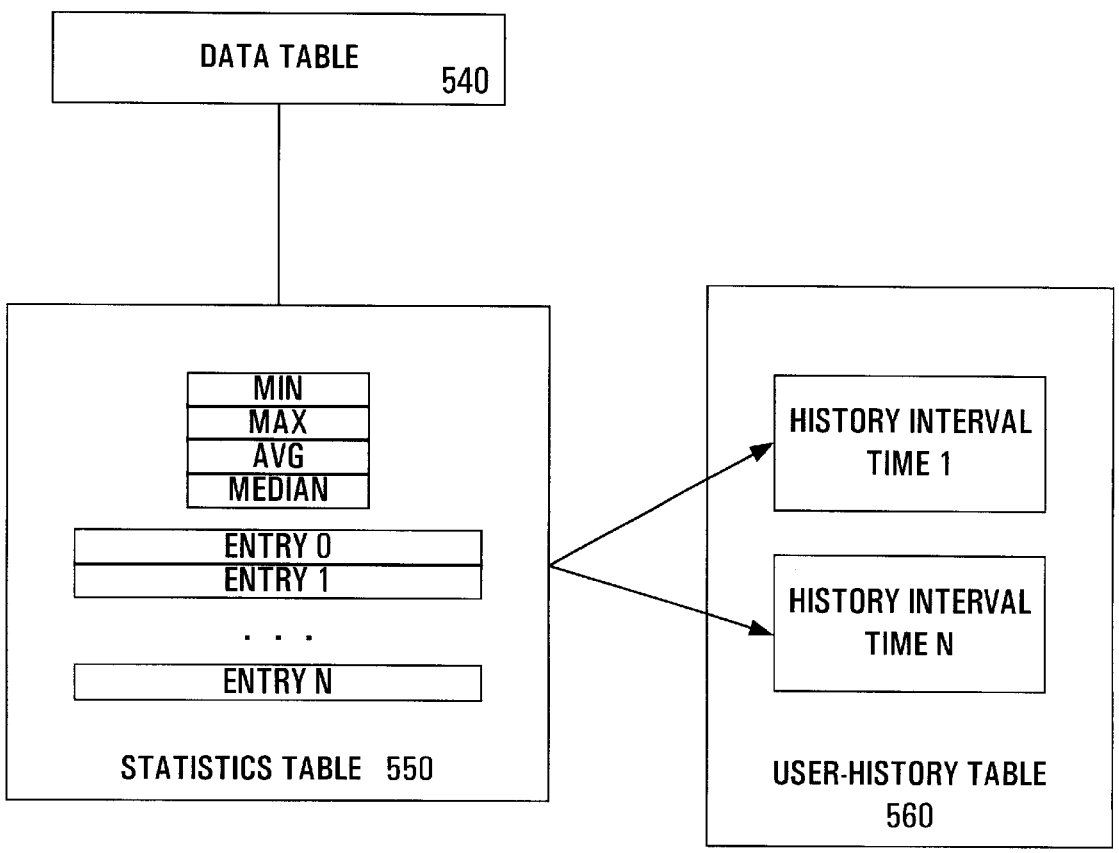
FIG. 5 is an illustration of a network performance statistics data table in accordance with one embodiment of the present invention.

Refer now to FIG. 5, which illustrates the memory structure of the present embodiment of the present invention within the computer-readable memory units of client computer system 110 and also in server computer system 250 of FIG. 2. In one embodiment, data table 540 is used to store entries consisting of the time difference between time-stamps. In one embodiment, data table 540 is alternatively referred to as a response time buffer.

In the present embodiment, statistics table 550 is used to store performance statistics that are based on the information stored in data table 540 or in a response time buffer. At a time interval specified by the network manager, the performance statistics in statistics table 550 are read to user-history table 560. In the present embodiment, statistics table 550 accumulates the minimum, maximum, average and median for the entries stored in data table 540. The information stored in statistics table 550 is collected for a specified time interval, and then read to user-history table 560. In user-history table 560, a set of data are stored for each of a plurality of time intervals. The set of data stored for each time interval may also be combined to compute data for a longer time interval. The data stored in user-history table 560 are time-stamped to indicate the time interval corresponding to each set of data. Thus, the data can be sorted according to the time interval during which it was collected.

At a time interval specified by the network manager, the data stored in user-history table 560 are read to a central computer system (e.g., central computer system, or edge monitor, 300 of FIG. 3).

SYSTEM INFORMATION—DEFINITION

In addition to the network performance statistics described above, system information consisting of system performance statistics and system parameters are measured by a host computer system and communicated to a central computer system in accordance with the present invention.

In the present embodiment of the present invention, "system performance statistics" generally describe dynamic data collected by a host computer system (e.g., client computer system 110 or server computer system 250 of FIG. 2) regarding its own performance. For example, system performance statistics include the number of errors or the number of page faults that occur for a computer system during a time interval specified by the network manager. System performance statistics are periodically communicated to a central computer system (e.g., edge monitor 300 of FIG. 3) at a time interval specified by the network manager. System performance statistics collected in one embodiment of the present invention are described in the Code Sections below. In alternative embodiments, additional system performance statistics are specified.

In the present embodiment, "system parameters" generally describe static information or information that does not frequently change that is collected by a host computer system (e.g., client computer system 110 or server computer system 250) regarding its own hardware and software capabilities. For example, system parameters include the quantity of memory available in a data storage device of a host computer system (e.g., data storage device 104 of FIG. 1) or the quantity of random access memory available in a computer system (e.g., random access memory 102 of FIG. 1). System parameters also describe the number of applications or the number of processes residing in a computer system. In one embodiment, system parameters are periodically communicated to a central computer system (e.g., edge monitor 300 of FIG. 3) at a time interval specified by the network manager. In one embodiment, system parameters are only communicated to a central computer system when they change from a value previously reported to the central computer system. System parameters collected in one embodiment of the present invention are described in the Code Sections below. In alternative embodiments, additional system parameters are specified.

In the present embodiment, the present invention uses an extension to an RMON MIB to implement the method and architecture for specifying and collecting the system information (system performance statistics and system parameters) to be measured. As previously discussed, RMON is a supplement to the SNMP protocol currently employed in computer system communication networks, and thus the present embodiment of the present invention is compatible with the standards currently in use. In the present embodiment, the RMON MIB is implemented in the client and server computer systems in accordance with the application Title-TBD, Filing Date Jun. 24, 1997, Ser. No. 08/882,207, which is hereby incorporated by reference. Hence, the present embodiment of the present invention does not require additional hardware and so provides a cost-effective method for monitoring network and system performance.

The RMON MIB specified in accordance with the present embodiment is described in the Code Sections below.

Code Section A—RMON MIB Extension in Accordance with One Implementation of the Present Invention

```
IMPORTS
   MODULE-IDENTITY, OBJECT-TYPE,       FROM SNMPv2-SMI
   Counter32, Integer3
   DisplayString, TimeStamp             FROM SNMPv2-TC
   hostControlEntry, hostControlIndex   FROM RMON-MIB;
-- System Management and Performance Monitoring MIB
-- DESCRIPTION
-- "This MIB module, System Management and Performance Monitoring,
-- integrates with Application Response Time MIB to allow the
-- IT Manager to quickly differentiate between network problems and
-- system problems in a client-server environment."
-- : : = { genExperimental 16 }
   org       OBJECT IDENTIFIER : : = { iso 3 }
   dod       OBJECT IDENTIFIER : : = { org 6 }
   internet  OBJECT IDENTIFIER : : = { dod 1 }
   mgmt      OBJECT IDENTIFIER : : = { internet 2 }
   mib-2     OBJECT IDENTIFIER : : = { mgmt 1 }
   rmon      OBJECT IDENTIFIER : : = { mib-2 16 }
   hosts     OBJECT IDENTIFIER : : = { rmon 4 }
   sys       OBJECT IDENTIFIER : : = { hosts 4 }
   descr     OBJECT IDENTIFIER : : = { sys 1 }
   user      OBJECT IDENTIFIER : : = { sys 2 }
   cpu       OBJECT IDENTIFIER : : = { sys 3 }
   mem       OBJECT IDENTIFIER : : = { sys 4 }
   drive     OBJECT IDENTIFIER : : = { sys 5 }
   app       OBJECT IDENTIFIER : : = { sys 6 }
   process   OBJECT IDENTIFIER : : = { sys 7 }
   error     OBJECT IDENTIFIER : : = { sys 8 }
Access privileges:
level1: no access
level2: read-only access
level3: read-write access
level4: read-write access
```

The Description Group of the RMON MIB specified in accordance with the present embodiment is described in the Code Section below. The Description Group lists the inventory of the computer system and includes a description table, a processor table, and an input/output bus table.

Code Section B—Description Group

```
-- Description Table
descrTable OBJECT-TYPE
     SYNTAX        SEQUENCE OF DescrEntry
     MAX-ACCESS    not-accessible
     STATUS        current
     DESCRIPTION
        "A table that lists the inventory of the system."
     ::= { descr 1 }
descrEntry OBJECT-TYPE
     SYNTAX        DescrEntry
     MAX-ACCESS    not-accessible
     STATUS        current
     DESCRIPTION
        "A conceptual row in the descrTable."
     INDEX { sysIndex, sysAddress }
     ::= { descrTable 1 }
DescrEntry ::= SEQUENCE {
     sysIndex             Integer32,
     sysAddress           PhyAddress,
     descrSystemName      DisplayString,
     descrOSType          DisplayString,
     descrOSVersion       DisplayString,
     descrSystemDescr     DisplayString,
     descrFirmwareDescr   DisplayString,
     descrProcessorNumber Integer32,
     descrIOBusNumber     Integer32
}
sysIndexOBJECT-TYPE
     SYNTAX        PhysAddress
     MAX-ACCESS    not-accessible
     STATUS        current
     DESCRIPTION
        "The set of collected host statistics of which
        this entry is a part. The set of hosts
        identified by a particular value of this
        index is associated with the RMON hostControlEntry
        as identified by the same value of hostControlIndex.
        In other words, it refers to an interface of the RMON probe."
     ::= { descrEntry 1 }
sysAddress OBJECT-TYPE
     SYNTAX        PhysAddress
     MAX-ACCESS    not-accessible
     STATUS        current
     DESCRIPTION
        "Same as MIB-II ifPhysAddress, this is the physical address of
        this system. This address is at the protocol layer immediately
        'below' the network layer in the protocol stack.
        Example showing an Ethernet MAC address:
        <0x00><0xc0><0x4f><0xac><0xa6><0xc1>
        "
     ::= { descrEntry 2 }
descrSystemName OBJECT-TYPE
     SYNTAX        DisplayString (SIZE (0..127))
     MAX-ACCESS    read-only
     STATUS        current
     DESCRIPTION
        "The name of the system."
     ::= { descrEntry 3 }
descrOSType OBJECT-TYPE
     SYNTAX        DisplayString (SIZE (0..127))
     MAX-ACCESS    read-only
     STATUS        current
     DESCRIPTION
        "The operating system type of the system.
        Examples:    'Microsoft Windows NT Workstation',
                     'Microsoft Windows NT Server (Domain
                     Controller)',
                     'Microsoft Windows NT Server (Stand-alone)',
                     'Microsoft Windows 95',
                     'Unknown'."
     ::= { descrEntry 4 }
descrOSVersion OBJECT-TYPE
```

-continued

```
    SYNTAX          DisplayString (SIZE (0..127))
    MAX-ACCESS      read-only
    STATUS          current
    DESCRIPTION
        "The operating system version of the system.
        Examples:    '4.0 (Build 1381: Service Pack 3) Uniprocessor
                     Free',
                     '4.00.950 B',
                     '4.00.950',
                     'Unknown'."
    ::= { descrEntry 5 }
descrSystemDescr OBJECT-TYPE
    SYNTAX          DisplayString (SIZE (0..127))
    MAX-ACCESS      read-only
    STATUS          current
    DESCRIPTION
        "The manufacturer, product name and model of the system.
        Example: 'Dell GXa 300MTbr'."
    ::= { descrEntry 6 }
descrFirmwareDescr OBJECT-TYPE
    SYNTAX          DisplayString (SIZE (0..127))
    MAX-ACCESS      read-only
    STATUS          current
    DESCRIPTION
        "The manufacturer, product name and version of the system
        firmware.
        Example: 'Phoenix BIOX PLUS Version 1, 09/19/97'."
    ::= { descrEntry 7 }
descrProcessorNumber OBJECT-TYPE
    SYNTAX          Integer32 (1..65535)
    MAX-ACCESS      read-only
    STATUS          current
    DESCRIPTION
        "The number of processors (regardless of their current state)
        present in this system.
        Example: 1
        "
    ::= { descrEntry 8 }
descrIOBusNumber OBJECT-TYPE
    SYNTAX          Integer32 (1..65535)
    MAX-ACCESS      read-only
    STATUS          current
    DESCRIPTION
        "The number of Input Output Buses (regardless of their current
        state) present in this system.
        Example: 1
        "
    ::= { descrEntry 9 }
-- Processor Table
descrProcessorTable OBJECT-TYPE
    SYNTAX          SEQUENCE OF DescrProcessorEntry
    MAX-ACCESS      not-accessible
    STATUS          current
    DESCRIPTION
        "A table that lists the processors of the system."
    ::= { descr 2 }
descrProcessorEntry OBJECT-TYPE
    SYNTAX          DescrProcessorEntry
    MAX-ACCESS      not-accessible
    STATUS          current
    DESCRIPTION
        "A conceptual row in the descrProcessorTable."
    INDEX { sysIndex, sysAddress, descrProcessorIndex }
    ::= { descrProcessorTable 1 }
DescrProcessorEntry ::= SEQUENCE {
    descrProcessorIndex       Integer32,
    descrProcessorDescr       DisplayString,
    descrProcessorClockSpeed  Integer32
}
descrProcessorIndex OBJECT-TYPE
    SYNTAX          Integer32 (1..65535)
    MAX-ACCESS      not-accessible
    STATUS          current
    DESCRIPTION
        "An index that uniquely identifies a particular processor of the
        system uniquely identified by sysIndex and sysAddress."
    ::= { descrProcessorEntry 1 }
descrProcessorDescr OBJECT-TYPE
    SYNTAX          DisplayString (SIZE (0..127))
```

-continued

```
    MAX-ACCESS      read-only
    STATUS          current
    DESCRIPTION
        "Manufacturer and family of the processor.
        For Windows NT, processor revision is also included.
        Examples:    'Intel Pentium Model 4 Stepping 4'
                     'Intel 80486'."
    ::= { descrProcessorEntry 2 }
descrProcessorClockSpeed OBJECT-TYPE
    SYNTAX          Integer32 (-1..2147483647)
    MAX-ACCESS      read-only
    STATUS          current
    DESCRIPTION
        "Clock speed (in Mhz) of the processor. -1 means that the clock
        speed is greater than 0 but less than 1 Mhz.
        Example: 300
        "
    ::= { descrProcessorEntry 3 }
-- IO Bus Table
descrIOBusTable OBJECT-TYPE
    SYNTAX          SEQUENCE OF DescrIOBusEntry
    MAX-ACCESS      not-accessible
    STATUS          current
    DESCRIPTION
        "A table that lists the IO Buses of the system."
    ::= { descr 3 }
descrIOBusEntry OBJECT-TYPE
    SYNTAX          DescrIOBusEntry
    MAX-ACCESS      not-accessible
    STATUS          current
    DESCRIPTION
        "A conceptual row in the descrIOBusTable."
    INDEX { sysIndex, sysAddress, descrIOBusIndex }
    ::= { descrIOBusTable 1 }
DescrIOBusEntry ::= SEQUENCE {
    descrIOBusIndex   Integer32,
    descrIOBusDescr   DisplayString
}
descrIOBusIndex OBJECT-TYPE
    SYNTAX          Integer32 (1..65535)
    MAX-ACCESS      not-accessible
    STATUS          current
    DESCRIPTION
        "An index that uniquely identifies a particular IO Bus of the
        system uniquely identified by sysIndex and sysAddress."
    ::= { descrIOBusEntry 1 }
descrIOBusDescr OBJECT-TYPE
    SYNTAX          DisplayString (SIZE (0..127))
    MAX-ACCESS      read-only
    STATUS          current
    DESCRIPTION
        "Description of the IO Bus by including the bus type, bus width,
        and bus speed.
        Example: 'PCI 32-bit 33MHz'."
    ::= { descrIOBusEntry 2 }
```

The User Group of the RMON MIB specified in accordance with the present embodiment is described in the Code Section below. The User Group provides a table listing information regarding user sessions.

Code Section C—User Group

```
userTable OBJECT-TYPE
    SYNTAX          SEQUENCE OF UserEntry
    MAX-ACCESS      not-accessible
    STATUS          current
    DESCRIPTION
        "A table that lists user sessions."
    ::= { user 1 }
userEntry OBJECT-TYPE
    SYNTAX          UserEntry
    MAX-ACCESS      not-accessible
```

-continued

```
    STATUS          current
    DESCRIPTION
        "A conceptual row in the userTable."
    INDEX { sysIndex, sysAddress, userIndex }
    ::= { userTable 1 }
UserEntry ::= SEQUENCE {
    userIndex           Integer32,
    userName            DisplayString
}
userIndex OBJECT-TYPE
    SYNTAX          Integer32 (1..65535)
    MAX-ACCESS      not-accessible
    STATUS          current
    DESCRIPTION
        "Basic row index that uniquely identifies a particular user
        session."
    ::= { userEntry 1 }
userName OBJECT-TYPE
    SYNTAX          DisplayString (SIZE (0..127))
    MAX-ACCESS      read-only
    STATUS          current
    DESCRIPTION
        "The name of the user session.
        Example: 'User One'."
    ::= { userEntry 2 }
```

The Central Processing Unit (CPU) Group of the RMON MIB specified in accordance with the present embodiment is described in the Code Section below. The CPU Group includes a table showing CPU usage.

Code Section D—CPU Group

```
cpuTable OBJECT-TYPE
    SYNTAX          SEQUENCE OF CpuEntry
    MAX-ACCESS      not-accessible
    STATUS          current
    DESCRIPTION
        "A table that shows CPU usage."
    : : = { cpu 1 }
cpuEntry OBJECT-TYPE
    SYNTAX          CpuEntry
    MAX-ACCESS      not-accessible
    STATUS          current
    DESCRIPTION
        "A conceptual row in the cpuTable."
    INDEX { sysIndex, sysAddress }
    : : = { cpuTable 1 }
CpuEntry : : = SEQUENCE {
    cpuUsage            Integer32
}
cpuUsage OBJECT-TYPE
    SYNTAX          Integer32 (0 . . 100)
    MAX-ACCESS      read-only
    STATUS          current
    DESCRIPTION
        "The average percentage of time that all processors on the
        system are executing non-idle threads.
        Example: 6
        "
    : : = { cpuEntry 1 }
```

The Memory Group of the RMON MIB specified in accordance with the present embodiment is described in the Code Section below. The Memory Group provides a table that shows memory properties such as the available memory in a data storage device and in a random access memory unit.

Code Section E—Memory Group

```
memTable OBJECT-TYPE
    SYNTAX          SEQUENCE OF MemEntry
    MAX-ACCESS      not-accessible
    STATUS          current
    DESCRIPTION
        "A table that shows the memory properties."
    ::= { mem 1 }
memEntry OBJECT-TYPE
    SYNTAX          MemEntry
    MAX-ACCESS      not-accessible
    STATUS          current
    DESCRIPTION
        "A conceptual row in the memTable."
    INDEX { sysIndex, sysAddress }
    ::= { memTable 1 }
MemEntry ::= SEQUENCE {
    memUsage                    Integer32,
    memSwapSpaceLimit           Integer32,
    memPhysicalMemTotal         Integer32,
    memPhysicalMemAvailable     Integer32,
    memPhysicalMemFileCache     Integer32,
    memPageFaults               Integer32,
    memPageIns                  Integer32,
    memPageOuts                 Integer32
}
memUsage OBJECT-TYPE
    SYNTAX          Integer32 (0..4294967295)
    MAX-ACCESS      read-only
    STATUS          current
    DESCRIPTION
        "The amount of virtual memory in use by all processes, in KB.
        Example: 71836
        "
    ::= { memEntry 1 }
memSwapSpaceLimit OBJECT-TYPE
    SYNTAX          Integer32 (0..4294967295)
    MAX-ACCESS      read-only
    STATUS          current
    DESCRIPTION
        "The amount of swap space, in KB, that can be committed to all
        processes without enlarging the swap file.
        Example: 118520
        "
    ::= { memEntry 2 }
memPhysicalMemTotal OBJECT-TYPE
    SYNTAX          Integer32 (0..4294967295)
    MAX-ACCESS      read-only
    STATUS          current
    DESCRIPTION
        "The amount of physical random access memory installed in the
        system, in KB.
        Example: 32180
        "
    ::= { memEntry 3 }
memPhysicalMemAvailable OBJECT-TYPE
    SYNTAX          Integer32 (0..4294967295)
    MAX-ACCESS      read-only
    STATUS          current
    DESCRIPTION
        "The amount of physical memory available to processes, in KB.
        Example: 3956
        "
    ::= { memEntry 4 }
memPhysicalMemFileCache OBJECT-TYPE
    SYNTAX          Integer32 (0..4294967295)
    MAX-ACCESS      read-only
    STATUS          current
    DESCRIPTION
        "The amount of physical memory released to the file cache on
        demand, in KB.
        Example: 9796
        "
    ::= { memEntry 5 }
memPageFaults OBJECT-TYPE
    SYNTAX          Integer32 (0..4294967295)
    MAX-ACCESS      read-only
    STATUS          current
```

-continued

```
    DESCRIPTION
        "The number of pages faulted per second. It includes both hard
        faults (those that require disk access) and soft faults (where
        the faulted page is found elsewhere in physical memory.)
        Example: 123
        "
    ::= { memEntry 6 }
memPageIns OBJECT-TYPE
    SYNTAX          Integer32 (0..4294967295)
    MAX-ACCESS      read-only
    STATUS          current
    DESCRIPTION
        "The number of pages per second read from disk to resolve hard
        page faults. (Hard page faults occur when a process refers to
        a page in virtual memory that is not in its working set or
        elsewhere in physical memory, and must be retrieved from disk.)
        When a page is faulted, the system tries to read multiple
        contiguous pages into memory to maximize the benefit of the
        costly read operation.
        Example: 42
        "
    ::= { memEntry 7 }
memPageOuts OBJECT-TYPE
    SYNTAX          Integer32 (0..4294967295)
    MAX-ACCESS      read-only
    STATUS          current
    DESCRIPTION
        "The number of pages per second written to disk to free up
        space
        in physical memory. Pages are written back to disk only if
        they are changed in physical memory, so they are likely to hold
        data, not code. A high rate of pages output might indicate a
        memory shortage.
        Example: 5
        "
    ::= { memEntry 8 }
```

The Drive Group of the RMON MIB specified in accordance with the present embodiment is described in the Code Section below. The Drive Group provides information regarding the hard disk performance, drive properties, and drive controller properties, and includes a hard disk table, a drive table, and a drive controller table.

Code Section F—Drive Group

```
-- Hard Disk Table
driveHardDiskTable OBJECT-TYPE
    SYNTAX          SEQUENCE OF DriveHardDiskEntry
    MAX-ACCESS      not-accessible
    STATUS          current
    DESCRIPTION
        "A table that lists the hard disk performance."
    ::= { drive 1 }
driveHardDiskEntry OBJECT-TYPE
    SYNTAX          DriveHardDiskEntry
    MAX-ACCESS      not-accessible
    STATUS          current
    DESCRIPTION
        "A conceptual row in the driveHardDiskTable."
    INDEX { sysIndex, sysAddress }
    ::= { driveHardDiskTable 1 }
DriveHardDiskEntry ::= SEQUENCE {
    driveHardDiskReadRate   Integer32,
    driveHardDiskWriteRate  Integer32
}
driveHardDiskReadRate OBJECT-TYPE
    SYNTAX          Integer32 (0..4294967295)
    MAX-ACCESS      read-only
    STATUS          current
    DESCRIPTION
        "Bytes per second transferred from all hard disks during read
        operations."
    ::= { driveHardDiskEntry 1 }
driveHardDiskWriteRate OBJECT-TYPE
    SYNTAX          Integer32 (0..4294967295)
    MAX-ACCESS      read-only
    STATUS          current
    DESCRIPTION
        "Bytes per second transferred to all hard disks during write
        operations."
    ::= { driveHardDiskEntry 2 }
-- Drive Table
driveTable OBJECT-TYPE
    SYNTAX          SEQUENCE OF DriveEntry
    MAX-ACCESS      not-accessible
    STATUS          current
    DESCRIPTION
        "A table that lists all the drive letter properties."
    ::= { drive 2 }
driveEntry OBJECT-TYPE
    SYNTAX          DriveEntry
    MAX-ACCESS      not-accessible
    STATUS          current
    DESCRIPTION
        "A conceptual row in the driveTable."
    INDEX { sysIndex, sysAddress, driveIndex }
    ::= { driveTable 1 }
DriveEntry ::= SEQUENCE {
    driveIndex          Integer32,
    driveLetter         DisplayString,
    driveType           DisplayString,
    driveFileSystem     INTEGER,
    driveTotal          Integer32,
    driveFree           Integer32
}
driveIndex OBJECT-TYPE
    SYNTAX          Integer32 (1..65535)
    MAX-ACCESS      not-accessible
    STATUS          current
    DESCRIPTION
        "An index that uniquely identifies a drive of the
        system uniquely identified by sysIndex and sysAddress."
    ::= { driveEntry 1 }
driveLetter OBJECT-TYPE
    SYNTAX          DisplayString (SIZE (0..127))
    MAX-ACCESS      read-only
    STATUS          current
    DESCRIPTION
        "Drive letter - the DOS/Windows convention of drive letter
        assigned to a logical partition.
        Examples:  'C:'
                   'A:'."
    ::= { driveEntry 2 }
driveType OBJECT-TYPE
    SYNTAX          DisplayString (SIZE (0..127))
    MAX-ACCESS      read-only
    STATUS          current
    DESCRIPTION
        "Example:
        'Removable drive'   for floppy, Jaz, Zip, etc.
        'Fixed drive'
        '\\enab_dev\public'  shows network share point
        'CD-ROM drive'."
    ::= { driveEntry 3 }
driveFileSystem OBJECT-TYPE
    SYNTAX          INTEGER {
                        Other(1),
                        Unknown(2),
                        NoDiskLoaded(3),
                        FAT(4),
                        FAT32(5),
                        NTFS(6),
                        HPFS(7),         -- OS/2 High Per-
                                            formance File System
                        BerkeleyFFS(8),
                        Sys5FS(9),
                        HFS(10),         -- Macintosh Hier-
                                            archical File System
                        MFS(11),         -- Macintosh File
                                            System
                        ISO9660(12),     -- CD File System
```

```
            UDF(13),
            NFS(14),
            Netware (15)
        }
    MAX-ACCESS    read-only
    STATUS        current
    DESCRIPTION
        "Identifies the file system of the drive, or indicates that the
        disk is not loaded for removable drive."
    ::= { driveEntry 4 }
driveTotal OBJECT-TYPE
    SYNTAX        Integer32 (0..4294967295)
    MAX-ACCESS    read-only
    STATUS        current
    DESCRIPTION
        "The total capacity of the drive, in KB.
        Example: '4,193,280'."
    ::= { driveEntry 5 }
driveFree OBJECT-TYPE
    SYNTAX        Integer32 (0..4294967295)
    MAX-ACCESS    read-only
    STATUS        current
    DESCRIPTION
        "The free space on the drive, in KB.
        Example: '839,476'."
    ::= { driveEntry 6 }
-- Drive Controller Table
driveControllerTable OBJECT-TYPE
    SYNTAX        SEQUENCE OF DriveControllerEntry
    MAX-ACCESS    not-accessible
    STATUS        current
    DESCRIPTION
        "A table that lists the drive controller properties."
    ::= { drive 3 }
driveControllerEntry OBJECT-TYPE
    SYNTAX        DriveEntry
    MAX-ACCESS    not-accessible
    STATUS        current
    DESCRIPTION
        "A conceptual row in the driveTable."
    INDEX { sysIndex, sysAddress, driveControllerIndex }
    ::= { driveTableController 1 }
DriveEntry ::= SEQUENCE {
    driveControllerIndex        Integer32,
    driveControllerType         INTEGER,
    driveControllerDescr        DisplayString,
    driveControllerFirmwareDescr DisplayString
}
driveControllerIndex OBJECT-TYPE
    SYNTAX        Integer32 (1..65535)
    MAX-ACCESS    not-accessible
    STATUS        current
    DESCRIPTION
        "An index that uniquely identifies a drive controller of the
        system uniquely identified by sysIndex and sysAddress."
    ::= { driveControllerEntry 1 }
driveControllerType OBJECT-TYPE
    SYNTAX        INTEGER {
            Other(1),
            Unknown(2),
            UltraDMA33(3),
            SCSIUltraWideSingleEnded(4),
            SCSIUltra80LVDS(5),
            IEEE1394(6)
        }
    MAX-ACCESS    read-only
    STATUS        current
    DESCRIPTION
        "Identifies the type of the drive controller."
    ::= { driveControllerEntry 2 }
driveControllerDescr OBJECT-TYPE
    SYNTAX        DisplayString (SIZE (0..127))
    MAX-ACCESS    read-only
    STATUS        current
    DESCRIPTION
        "Description of the drive controller by including the
        manufacturer, product name, and model.
        Example:
            'Adaptec AHA-294X PCI SCSI Controller'."
    ::= { driveControllerEntry 3 }
driveControllerFirmwareDescr OBJECT-TYPE
    SYNTAX        DisplayString (SIZE (0..127))
    MAX-ACCESS    read-only
    STATUS        current
    DESCRIPTION
        "Description of the drive controller firmware by the firmware
        version.
        Example:
            'BIOS Version 1.25, 01/9/97'."
    ::= { driveControllerEntry 4 }
```

The Application Group of the RMON MIB specified in accordance with the present embodiment is described in the Code Section below. The Application Group provides a summary of applications residing on the computer system and lists the application properties, and includes an applications summary table and an application table.

Code Section G—Application Group

```
-- Application Summary Table
appSummaryTable OBJECT-TYPE
    SYNTAX        SEQUENCE OF AppSummaryEntry
    MAX-ACCESS    not-accessible
    STATUS        current
    DESCRIPTION
        "A table that lists summaries of all applications."
    ::= { app 1 }
appSummaryEntry OBJECT-TYPE
    SYNTAX        AppSummaryEntry
    MAX-ACCESS    not-accessible
    STATUS        current
    DESCRIPTION
        "A conceptual row in the appSummaryTable."
    INDEX { sysIndex, sysAddress }
    ::= { appSummaryTable 1 }
AppSummaryEntry ::= SEQUENCE {
    appSummaryNumber    Counter32
}
appSummaryNumber OBJECT-TYPE
    SYNTAX        Counter32
    MAX-ACCESS    read-only
    STATUS        current
    DESCRIPTION
        "The number of applications in the system.
        Example: 4
        "
    ::= { appSummaryEntry 1 }
-- Application Table
appTable OBJECT-TYPE
    SYNTAX        SEQUENCE OF AppEntry
    MAX-ACCESS    not-accessible
    STATUS        current
    DESCRIPTION
        "A table that lists application properties."
    ::= { app 2 }
appEntry OBJECT-TYPE
    SYNTAX        AppEntry
    MAX-ACCESS    not-accessible
    STATUS        current
    DESCRIPTION
        "A conceptual row in the appTable."
    INDEX { sysIndex, sysAddress, appIndex }
    ::= { appTable 1 }
AppEntry ::= SEQUENCE {
    appIndex        Integer32,
    appTitle        DisplayString,
    appState        INTEGER,
    appDescr        DisplayString
}
appIndex OBJECT-TYPE
    SYNTAX        Integer32 (1..65535)
```

-continued

```
    MAX-ACCESS    not-accessible
    STATUS        current
    DESCRIPTION
        "Basic row index that uniquely identifies a particular
        application."
    ::= { appEntry 1 }
appTitle OBJECT-TYPE
    SYNTAX        DisplayString (SIZE (0..127))
    MAX-ACCESS    read-only
    STATUS        current
    DESCRIPTION
        "Title of the application.
        Example:
            'Internet Explorer'."
    ::= { appEntry 2 }
appState OBJECT-TYPE
    SYNTAX        INTEGER {
                        Unknown(1),
                        Running(2),
                        NotResponding(3)
                  }
    MAX-ACCESS    read-only
    STATUS        current
    DESCRIPTION
        "The state of the application."
    ::= { appEntry 3 }
appDescr OBJECT-TYPE
    SYNTAX        DisplayString (SIZE (0..127))
    MAX-ACCESS    read-only
    STATUS        current
    DESCRIPTION
        "Description of the application by including the manufacturer,
        product name, and version.
        Example:
            'Microsoft Internet Explorer 4.0'."
    ::= { appEntry 4 }
```

The Process Group of the RMON MIB specified in accordance with the present embodiment is described in the Code Section below. The Process Group provides a summary of the processes utilized by the computer system and lists the process properties, and includes a process summary table and a process table.

Code Section H—Process Group

```
-- Process Summary Table
processSummaryTable OBJECT-TYPE
    SYNTAX        SEQUENCE OF ProcessSummaryEntry
    MAX-ACCESS    not-accessible
    STATUS        current
    DESCRIPTION
        "A table that lists summaries of all processes."
    ::= { process 1 }
processSummaryEntry OBJECT-TYPE
    SYNTAX        ProcessSummaryEntry
    MAX-ACCESS    not-accessible
    STATUS        current
    DESCRIPTION
        "A conceptual row in the processSummaryTable."
    INDEX { sysIndex, sysAddress }
    ::= { processTable 1 }
ProcessSummaryEntry ::= SEQUENCE {
    processSummaryNumber    Counter32
}
processSummaryNumber OBJECT-TYPE
    SYNTAX        Counter32
    MAX-ACCESS    read-only
    STATUS        current
    DESCRIPTION
        "The number of processes in the system.
        Example: 26
        "
```

```
    ::= { processSummaryEntry 1 }
-- Process Table
processTable OBJECT-TYPE
    SYNTAX        SEQUENCE OF processEntry
    MAX-ACCESS    not-accessible
    STATUS        current
    DESCRIPTION
        "A table that lists process properties."
    ::= { process 2 }
processEntry OBJECT-TYPE
    SYNTAX        ProcessEntry
    MAX-ACCESS    not-accessible
    STATUS        current
    DESCRIPTION
        "A conceptual row in the processTable."
    INDEX { sysIndex, sysAddress, processIndex }
    ::= { processTable 1 }
ProcessEntry ::= SEQUENCE {
    processIndex          Integer32,
    processTitle          DisplayString,
    processState          INTEGER,
    processID             Integer32,
    processCPUUsage       Integer32,
    processWorkingSet     Integer32,
    processPageFaults     Integer32,
    processBasePriority   INTEGER,
    processFilePath       DisplayString
}
processIndex OBJECT-TYPE
    SYNTAX        Integer32 (1..65535)
    MAX-ACCESS    not-accessible
    STATUS        current
    DESCRIPTION
        "Basic row index that uniquely identifies a particular process."
    ::= { processEntry 1 }
processTitle OBJECT-TYPE
    SYNTAX        DisplayString (SIZE (0..127))
    MAX-ACCESS    read-only
    STATUS        current
    DESCRIPTION
        "Title of the process.
        Example:
            'RAS Server'."
    ::= { processEntry 2 }
processState OBJECT-TYPE
    SYNTAX        INTEGER {
                        Unknown(1),
                        Running(2),
                        NotResponding(3),
                        Suspended(4),
                        Terminated(5)
                  }
    MAX-ACCESS    read-only
    STATUS        current
    DESCRIPTION
        "The state of the process."
    ::= { processEntry 3 }
processID OBJECT-TYPE
    SYNTAX        Integer32 (1..65535)
    MAX-ACCESS    not-accessible
    STATUS        current
    DESCRIPTION
        "Identification number of the process.
        Example: 2
        "
    ::= { processEntry 4 }
processCPUUsage OBJECT-TYPE
    SYNTAX        Integer32 (0..100)
    MAX-ACCESS    read-only
    STATUS        current
    DESCRIPTION
        "The percentage of time the threads of the process using the
        processors.
        Example: 98
        "
    ::= { processEntry 5 }
processWorkingSet OBJECT-TYPE
    SYNTAX        Integer32 (0..4294967295)
    MAX-ACCESS    read-only
```

-continued

```
    STATUS        current
    DESCRIPTION
        "The number of KB in the Working Set of this process. The
        Working Set is the set of memory pages touched recently by the
        threads of the process.
        Example: 5388
        "
    ::= { processEntry 6 }
processPageFaults OBJECT-TYPE
    SYNTAX        Integer32 (0..4294967295)
    MAX-ACCESS    read-only
    STATUS        current
    DESCRIPTION
        "The number of pages faulted per second by the threads of the
        process.
        Example: 1
        "
    ::= { processEntry 7 }
processBasePriority OBJECT-TYPE
    SYNTAX        INTEGER {
                      Normal(1),
                      High(2),
                      Low(3)
                  }
    MAX-ACCESS    read-only
    STATUS        current
    DESCRIPTION
        "The current base priority of this process. Threads within a
        process can raise and lower their own base priority relative to
        the process' base priority."
    ::= { processEntry 8 }
processFilePath OBJECT-TYPE
    SYNTAX        DisplayString (SIZE (0..127))
    MAX-ACCESS    read-only
    STATUS        current
    DESCRIPTION
        "The file path of the process.
        Example:
            'd:\winnt\system32\RASSRV.EXE'."
    ::= { processEntry 9 }
```

The Error Group of the RMON MIB specified in accordance with the present embodiment is described in the Code Section below. The Error Group lists a summary of errors and error properties, and includes an error summary table and an error table.

Code Section I—Error Group

```
-- Error Summary Table
errorSummaryTable OBJECT-TYPE
    SYNTAX        SEQUENCE OF ErrorsummaryEntry
    MAX-ACCESS    not-accessible
    STATUS        current
    DESCRIPTION
        "A table that lists summaries of all errors."
    ::= { error 1 }
errorSummaryEntry OBJECT-TYPE
    SYNTAX        ErrorSummaryEntry
    MAX-ACCESS    not-accessible
    STATUS        current
    DESCRIPTION
        "A conceptual row in the errorSummaryTable."
    INDEX { sysIndex, sysAddress }
    ::= { errorTable 1 }
ErrorSummaryEntry ::= SEQUENCE {
    errorSummaryNumber    Counter32
}
errorSummaryNumber OBJECT-TYPE
    SYNTAX        Counter32
    MAX-ACCESS    read-only
    STATUS        current
    DESCRIPTION
        "The number of errors in the system.
        Example: 1
        "
    ::= { errorSummaryEntry 1 }
-- Error Table
errorTable OBJECT-TYPE
    SYNTAX        SEQUENCE OF errorEntry
    MAX-ACCESS    not-accessible
    STATUS        current
    DESCRIPTION
        "A table that lists error properties."
    ::= { error 2 }
errorEntry OBJECT-TYPE
    SYNTAX        ErrorEntry
    MAX-ACCESS    not-accessible
    STATUS        current
    DESCRIPTION
        "A conceptual row in the errorTable."
    INDEX { sysIndex, sysAddress, processIndex }
    ::= { errorTable 1 }
ErrorEntry ::= SEQUENCE {
    errorIndex      Integer32,
    errorDescr      DisplayString,
    errorTime       TimeStamp,
    errorSeverity   INTEGER
}
errorIndex OBJECT-TYPE
    SYNTAX        Integer32 (1 .. 65535)
    MAX-ACCESS    not-accessible
    STATUS        current
    DESCRIPTION
        "Basic row index that uniquely identifies a particular error."
    ::= { errorEntry 1 }
errorDescr OBJECT-TYPE
    SYNTAX        DisplayString (SIZE (0 .. 1023))
    MAX-ACCESS    read-only
    STATUS        current
    DESCRIPTION
        "Description of the error.
        Example:
            '[D]eviceßcsi0 timeout'."
    ::= { errorEntry 2 }
errorTime OBJECT-TYPE
    SYNTAX        TimeStamp
    MAX-ACCESS    read-only
    STATUS        current
    DESCRIPTION
        "The value of sysUpTime when the error was detected."
    ::= { errorEntry 3 }
errorSeverity OBJECT-TYPE
    SYNTAX        INTEGER {
                      Red(1)
                      Yellow(2),  -- Warning
                      Green(3)    -- Informational only
                  }
    MAX-ACCESS    read-only
    STATUS        current
    DESCRIPTION
        "The severity of the error."
    ::= { errorEntry 4 }
END
```

SYSTEM INFORMATION—OPERATION

Figure 6:
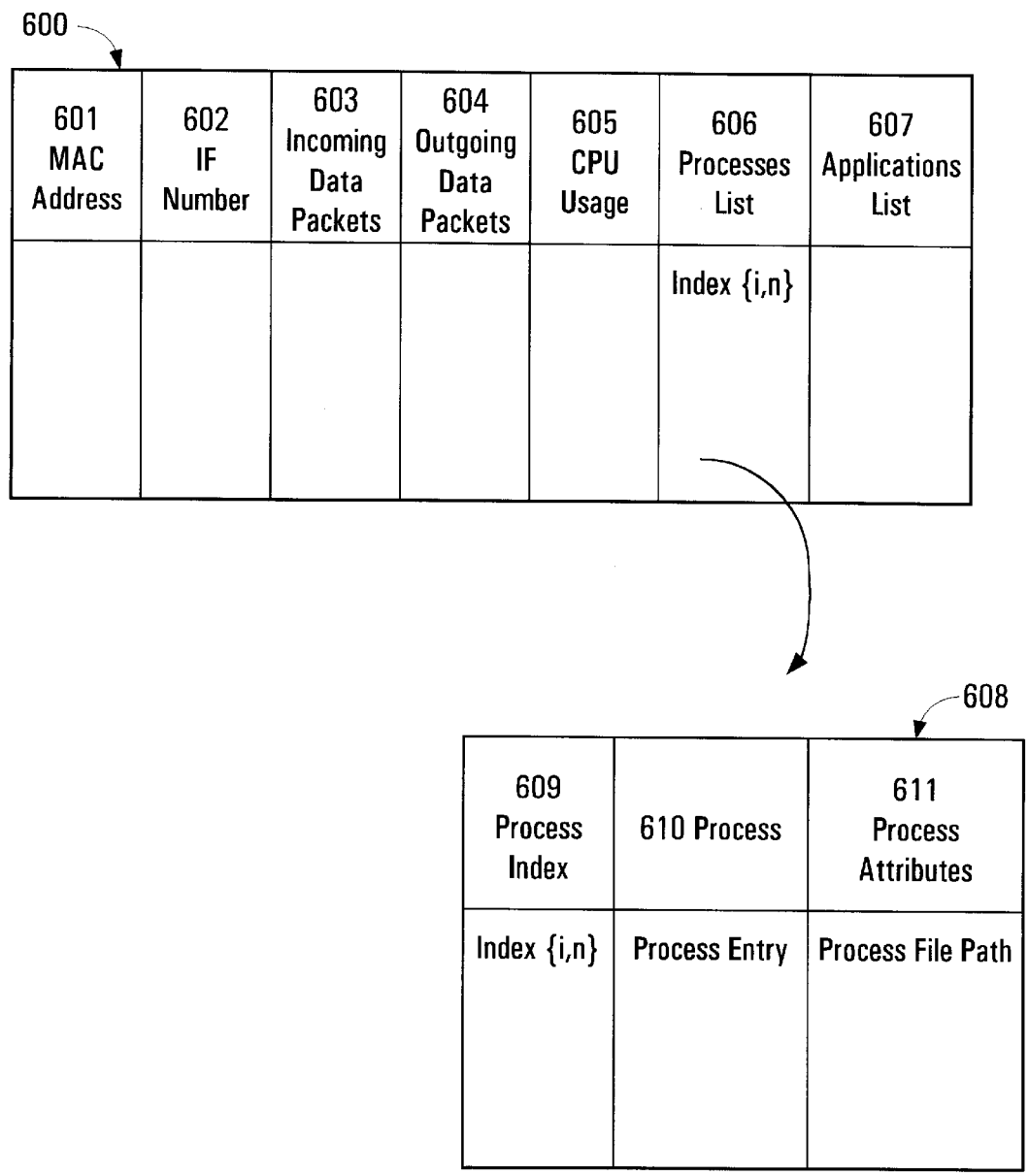
FIG. 6 is an illustration of a system information host group in accordance with one embodiment of the present invention.

Refer now to FIG. 6, which illustrates the memory structure within the computer-readable memory units of client computer system 110 and also in server computer system 250 of FIG. 2 in one embodiment of the present invention. Host group 600 is used to store the system information described by the Code Sections above. It is appreciated that host group 600 exemplifies a subset of the system information described by the Code Sections above, and that in another embodiment, host group 600 contains system information specified by the RMON MIB of the present embodiment of the present invention.

In one embodiment, the information in host group 600 is periodically transmitted to a central computer system (e.g., edge monitor 300 of FIG. 3) at a time interval established by the network manager. In one embodiment, the information in host group 600 is transmitted to edge monitor 300 when the information changes from a value previously communicated to the edge monitor. The information in host group 600 is time-stamped to indicate the time interval corresponding to when the information was collected.

With reference to FIG. 6, MAC (Medium Access Control) Address 601 identifies the particular host computer system to the edge monitor. IF (Interface) Number 602 identifies the particular segment (e.g., segment 305 of FIG. 3) to the central computer system. In this manner, edge monitor 300 can identify the specific host computer system associated with the system information received and catalogued by the edge monitor. In addition, edge monitor 300 can identify the network segment associated with the system information.

Continuing with reference to FIG. 6, other information stored in host group 600 in one embodiment is exemplified. Incoming data packets 603 represent the number of data packets received by the host computer (e.g., request data packet 290 received by server computer system 250 and response data packet 295 received by client computer system 110 of FIG. 2). Outgoing data packets 604 represent the number of data packets sent by the host computer (e.g., request data packet 290 sent by client computer system 110 and response data packet 295 sent by server computer system 250). CPU (central processing unit) usage 605 represents the amount of computer memory available (e.g., random access memory 102, read-only memory 103, and data storage device 104 of FIG. 1), including the total memory available and the amount of memory being used, and thus the remaining memory available.

In one embodiment, host group 600 of FIG. 6 also includes processes list 606 and applications list 607, which provide a compilation of the processes and applications residing in the host computer. Host group 600 is not limited to listing only the network processes and network applications. Using processes list 606 as an example in FIG. 6, the processes residing in the host computer are referenced to process group 608 by process index 609. Process group 608 includes a tabulation by process index 609 of processes 610 and also includes process attributes 611. In this embodiment, an analogous application group is referenced by host group 600.

APPLICATION TO INTEGRATED SYSTEM AND NETWORK MONITORING

The present invention enables the network manager to integrally view network performance statistics and system information that correspond to a contemporaneous time period and also correspond to the time that a problem on the communication network occurs.

Figure 7:
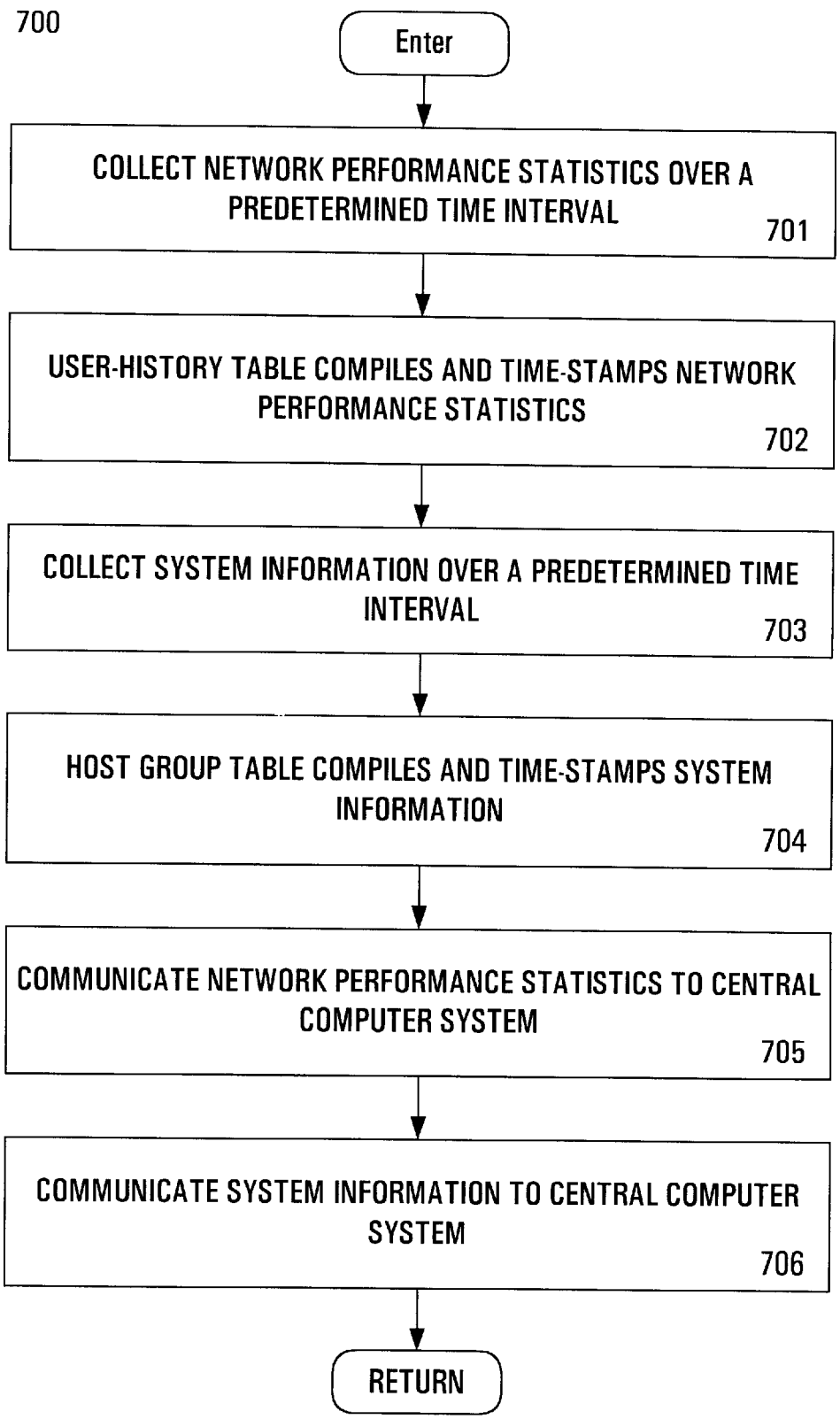
FIG. 7 is a flow chart of a process for collecting network performance statistics and system information in accordance with one embodiment of the present invention.

FIG. 7 illustrates a process 700 for collecting network and system information, where process 700 is implemented as program instructions stored in computer-readable memory units of client computer system 110 (FIG. 2) and executed by central processor 101 (FIG. 1), and also stored and executed on server computer system 250 (FIG. 2).

With reference to FIG. 7, in step 701 of the present embodiment, the network performance statistics described above are collected over a predetermined time interval for a client computer system and a server computer system (e.g., client computer system 110 and server computer system 250 of FIG. 2) using the method described in the copending patent application filed herewith, assigned to the assignee of the present invention, entitled "Application Response Time and Network Latency Monitoring Using End-Node Computer Systems," by Richard A. Fletcher and Prakash C. Banthia, with Ser. No. 09/141,968, incorporated herewith by reference, and still pending; and as described in the copending patent application filed herewith, assigned to the assignee of the present invention, entitled "Method for Analyzing Network Application Flows in an Encrypted Environment," by Richard A. Fletcher and Carl Lin, with Ser. No. 09/143,273, also incorporated herewith by reference, and still pending.

In step 702 of FIG. 7, in the present embodiment, the network performance statistics are stored in a memory unit (e.g., user-history table 560 of FIG. 5) of a host computer system (either the client computer system or the server computer system) for each time interval. In the present embodiment, the network performance statistics are time-stamped by the host computer system to indicate the time interval over which the statistics were measured and collected so that historical data can be identified by its collection period. Additional information is provided in the above-named copending patent applications. Additional information is also provided in the copending patent application entitled Title "Distributed Remote Moniroting (DRMON) for Network" Filing Date Jun. 24, 1997, with Ser. No. 08/882,207.

In step 703 of FIG. 7, concurrently with the collection of the network performance statistics, system information is collected by each host computer system regarding its own capabilities and performance. In other words, client computer system 110 measures and stores system information regarding its capabilities and performance, and server computer system 250 measures and stores system information regarding its capabilities and performance. In the present embodiment, the system performance statistics and system parameters collected by the host computer are as described in the Code Sections above.

In step 704 of FIG. 7, in the present embodiment, the system information for each host computer system is stored in a memory unit (e.g., host group 600 of FIG. 6) of each host computer system for each time interval. In the present embodiment, the system information is time-stamped by the host computer system to indicate the time interval over which the information was measured and collected so that historical data can be identified by its collection period.

In step 705 of FIG. 7, the network performance statistics are communicated over the communication network to a central computer system (e.g., edge monitor 300 of FIG. 3) as described in the concurrent applications referenced above. In step 706, the system information is also communicated over the communication network to edge monitor 300. In one embodiment, updated system information is communicated to edge monitor 300 at predetermined intervals, e.g., at 30-second intervals, although it is appreciated that other time intervals can be specified in accordance with the present invention. In an alternative embodiment, system parameters and system performance statistics are communicated to the edge monitor only when a value changes from a value previously communicated to the edge monitor.

Figure 8:
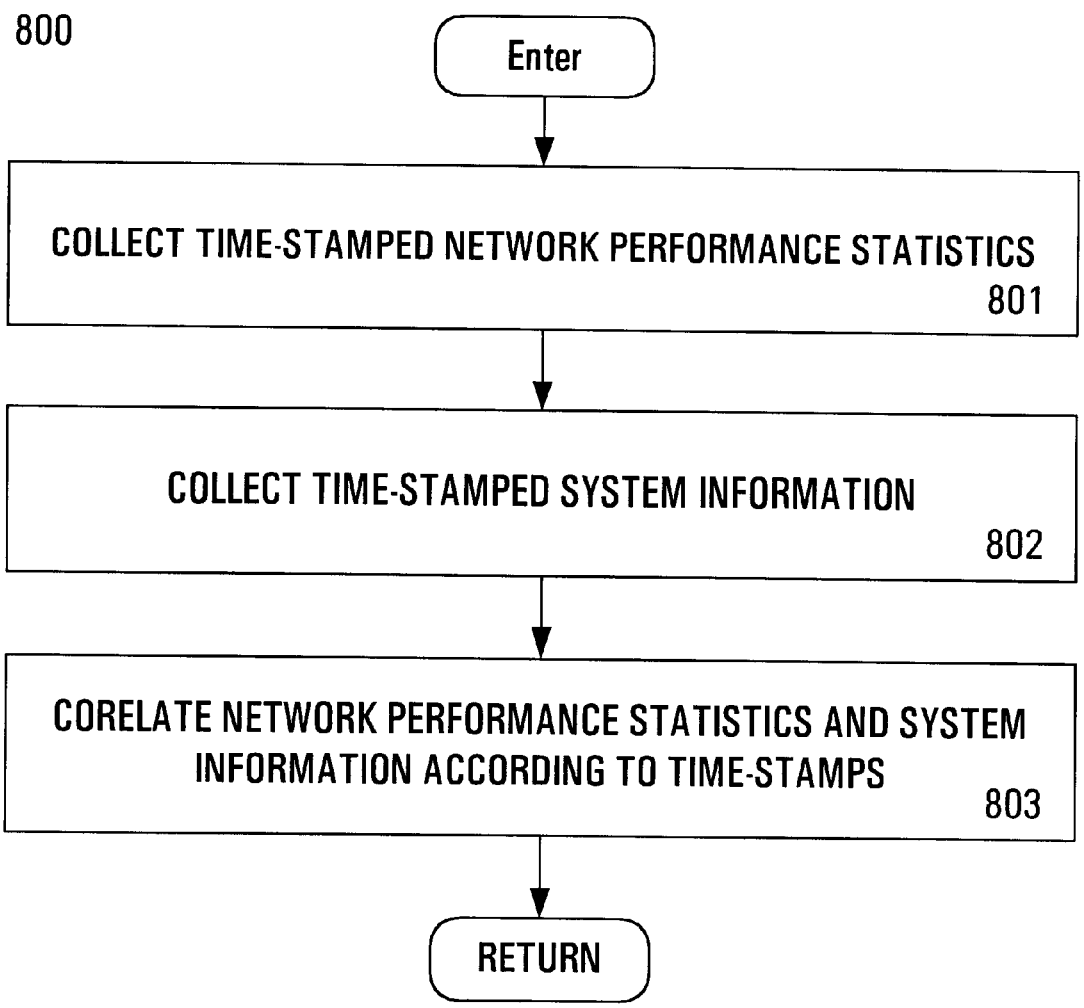
FIG. 8 is a flow chart of a process for correlating network performance statistics and system information in accordance with one embodiment of the present invention.

FIG. 8 illustrates a process 800 for collecting network and system information, where process 800 is implemented as program instructions stored in computer-readable memory units of edge monitor 300 (FIG. 3) and executed by central processor 101 (FIG. 1). In step 801, the network performance statistics determined by client computer system 110 and server computer system 250 and communicated to edge monitor 300 are stored in a memory unit of edge monitor 300. As noted above, the network performance statistics are time-stamped to indicate the time interval over which the statistics were collected. The network performance statistics are accumulated and retained in edge monitor 300 for a period of time specified by the network manager. Thus, in the present embodiment, historical information and recent updates to the historical information are provided by the network performance data stored in edge monitor 300.

In step 802 of FIG. 8, the system information determined by a host computer system (e.g., client computer system 110 or server computer system 250) and communicated to edge monitor 300 are stored in a memory unit of the edge monitor. As noted above, the system information is time-stamped to indicate the time interval over which the information was collected. The system information is accumulated over time and retained in edge monitor 300 for a period of time specified by the network manager. Thus, in the present embodiment, historical information and recent updates to the historical information are provided by the system information data stored in edge monitor 300.

In step 803 of FIG. 8, in the present embodiment, edge monitor 300 uses the time-stamps to correlate the network performance statistics and the system information collected over concurrent time periods. That is, the network performance statistics corresponding to a particular time interval are correlated to the system information corresponding to a contemporaneous time interval. In this manner, the present invention enables the network manager to integrally view corresponding network performance statistics and system information for a selected time interval, or for the time interval corresponding to the identification of a perturbation in the communication network. Additional information is provided by the copending patent application entitled system and method for providing information to applets in a virtual machine Ser. No. 08/873,440, now U.S. Pat. No. 5,922,044. The network and system information provided the present invention also enables the network manager to demonstrate compliance with a governing service level agreement.

With reference back to FIG. 3, an example is provided to illustrate the application of the present invention. A user of client computer system 110 is experiencing longer response times when running a network application over the communication network. In one embodiment, the present invention is monitoring application response time (refer to FIG. 4) between client computer system 110 and server computer system 250 and reporting the statistical results to edge monitor 300 as described above. In this embodiment, edge monitor 300 detects that application response time is greater than a predetermined limit and triggers an alarm in order to bring the potential problem to the attention of the network manager.

Continuing with the example, in response to the alarm, the network manager accesses edge monitor 300 to begin an investigation into the slow response time by reviewing network latency statistics (refer to FIG. 4) to determine if there is a problem with communication line 240, or with a router or switch (not shown) on that line. The network manager accesses the historical network performance data corresponding to the period of time contemporary to the time the perturbation occurred or was identified as indicated by the alarm or by a trouble report. If a problem is not indicated in the network equipment, the network manager is able to use system information corresponding to the same time period (e.g., the period of time contemporary to the time the perturbation occurred or was identified) and stored in edge monitor 300 to review the system information pertaining to client computer system 110 and server computer system 250. For example, the network manager might review the remaining amount of memory available or the number of page faults occurring in server computer system 250 in order to determine if the server computer system is "thrashing" because it is being overloaded by other users or by too many large network applications. Hence, in this manner the present invention provides integrated computer system and network monitoring to enable a network manager to integrally evaluate network and system information to readily ascertain the cause of a problem on the communication network. The present invention correlates the network and system information according to the time interval over which the information was collected, and the network manager is able to view the correlated information for the time period contemporaneous with the identification of a perturbation in the communication network.

In summary, the present invention provides system information for the host computer systems on a communication network and, in conjunction with the concurrent applications referenced above, the present invention also provides network information. The present invention allows the network manager to integrally review both network and system performance data by providing that data in one location. The present invention provides access to historical data and recent updates to that data. Using the time-stamps applied to the data, the present invention correlates the network information and system information, so that the network manager is able to review a "snap shot" of the events that were occurring concurrently in the network and in the computer system during the period of time when a perturbation or problem in the communication network is identified. Based on the information provided using the present invention, the network manager is able to identify whether the source of a problem is with the communication network equipment or with a host computer system on the network. Thus, in accordance with the present invention, the network manager can then focus on either the communication network or on the computer system, and use the information provided by the present invention to determine the cause of the problem.

The present invention provides a method to monitor a communication network that enables the network manager to readily detect a problem and determine the cause of the problem. Using the data provided by the present invention, the network manager is also able to demonstrate compliance with a service level agreement. The present embodiment of the present invention is implemented using an extension to an RMON MIB and is therefore compatible with SNMP protocol.

The preferred embodiment of the present invention, integrated computer system and network performance monitoring, is thus described. While the present invention has been described in particular embodiments, it should be appreciated that the present invention should not be construed as limited by such embodiments, but rather construed according to the following claims.

What is claimed is:

1. In a communication network comprising computer systems communicatively coupled with communication equipment, a method for monitoring communication performance comprising the steps of:

a) a computer system measuring and time-stamping network performance statistics and storing said network performance statistics in a memory unit of said computer system;

b) said computer system measuring and time-stamping system information and storing said system information in said memory unit of said computer system, wherein said system information recites system performance statistics and system parameters of said computer system, wherein said steps a) and b) are performed concurrently;

c) said computer system reporting said network performance statistics and said system information to a central computer system at specified time intervals, wherein said network performance statistics and said system information are indexed to said computer system; and d) said central computer system correlating network performance statistics measured during a specified time interval with system information measured during said specified time interval based on said time-stamping and storing said network performance statistics and said system information in a memory unit of said central computer system.

2. The method as recited in claim 1 further comprising the step of:
  e) said central computer system displaying correlated network performance statistics and system information in response to identification of a perturbation in said communication network, wherein said correlated network performance statistics and system information are displayed for a time interval contemporaneous with said perturbation.

3. The method as recited in claim 1 wherein said computer system is a client computer system.

4. The method as recited in claim 1 wherein said computer system is a server computer system.

5. The method as recited in claim 1 wherein step a) further comprises measuring application response time.

6. The method as recited in claim 1 wherein step a) further comprises measuring application processing time.

7. The method as recited in claim 1 wherein step a) further comprises measuring network latency.

8. The method as recited in claim 1 wherein step a) further comprises measuring protocol latency.

9. The method as recited in claim 1 wherein step b) is implemented using a management information base extension to Remote Network Monitoring (RMON)-based computer software, said management information base extension specifying said system information.

10. The method as recited in claim 1 wherein step b) further comprises measuring page faults by said computer system.

11. The method as recited in claim 1 wherein step b) further comprises measuring errors by said computer system.

12. The method as recited in claim 1 wherein step b) further comprises measuring hardware capabilities of said computer system.

13. The method as recited in claim 12 further comprising the step of quantifying available memory in a data storage device of said computer system.

14. The method as recited in claim 12 further comprising the step of quantifying available memory in a random access memory unit of said computer system.

15. The method as recited in claim 1 wherein step b) further comprises identifying network applications utilized by said computer system.

16. The method as recited in claim 1 wherein step b) further comprises identifying processes utilized by said computer system.

17. A computer system comprising:
  a processor coupled to a bus; and
  a memory unit coupled to said bus and having stored therein instructions that when executed by said processor implement a method for monitoring communication performance of a communication network comprising computer systems communicatively coupled to each other, said method comprising the steps of:
    a) measuring and time-stamping network performance statistics and storing said network performance statistics in said memory unit of said computer system;
    b) measuring and time-stamping system information and storing said system information in said memory unit of said computer system, wherein said system information recites system performance statistics and system parameters of said computer system, wherein said steps a) and b) are performed concurrently; and
    c) reporting said network performance statistics and said system information to a central computer system at specified time intervals, wherein said network performance statistics and said system information are indexed to said computer system; wherein
    d) said central computer system correlates network performance statistics measured during a specified time interval with system information measured during said specified time interval based on said time-stamping and storing said network performance statistics and said system information in a memory unit of said central computer system.

18. The computer system as described in claim 17 wherein said computer system is a client computer system.

19. The computer system as described in claim 17 wherein said computer system is a server computer system.

20. The computer system as described in claim 17 wherein said network performance statistics measure application response time, application processing time, network latency and protocol latency.

21. The computer system as described in claim 17 wherein said system information is specified in a management information base extension to Remote Network Monitoring (RMON)-based computer software.

22. The computer system as described in claim 17 wherein said system performance statistics measure page faults and errors by said computer system.

23. The computer system as described in claim 17 wherein said system parameters measure hardware capabilities of said computer system.

24. The computer system as described in claim 17 wherein said system parameters identify network applications and processes utilized by said computer system.

25. In a communication network comprising computer systems communicatively coupled with communication equipment, a method for monitoring communication performance comprising the steps of:
  a) a computer system measuring and time-stamping network performance statistics and storing said network performance statistics in a memory unit of said computer system;
  b) said computer system measuring and time-stamping system information and storing said system information in said memory unit of said computer system, wherein said system information is specified by a management information base extension to Remote Network Monitoring (RMON)-based computer software, wherein said steps a) and b) are performed concurrently;
  c) said computer system reporting said network performance statistics and said system information to a central computer system at specified time intervals, wherein said network performance statistics and said system information are indexed to said computer system;
  d) said central computer system correlating network performance statistics measured during a specified time interval with system information measured during said specified time interval based on said time-stamping and storing said network performance statistics and said system information in a memory unit of said central computer system; and
  e) said central computer system displaying correlated network performance statistics and system information in response to identification of a perturbation in said communication network, wherein said correlated network performance statistics and system information are displayed for a time interval contemporaneous with said perturbation.

* * * * *